(No Model.) 2 Sheets—Sheet 1.

O. EISELE.
REVOLVING VISE.

No. 513,261. Patented Jan. 23, 1894.

WITNESSES:

INVENTOR:
Otto Eisele,
BY
ATTORNEY (No Model.)	2 Sheets—Sheet 2.
O. EISELE.
REVOLVING VISE.
No. 513,261.	Patented Jan. 23, 1894.
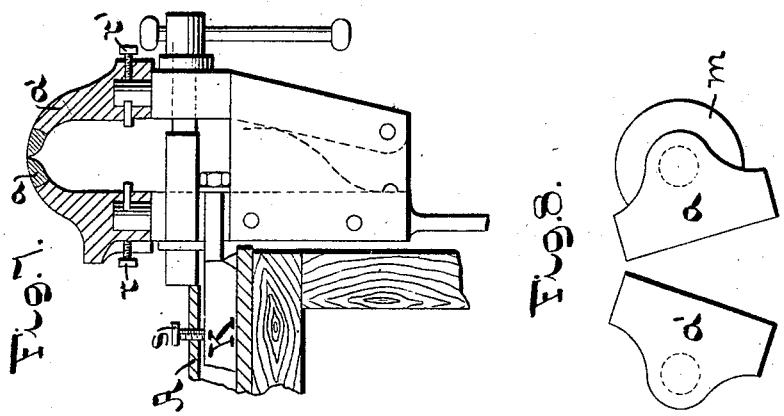
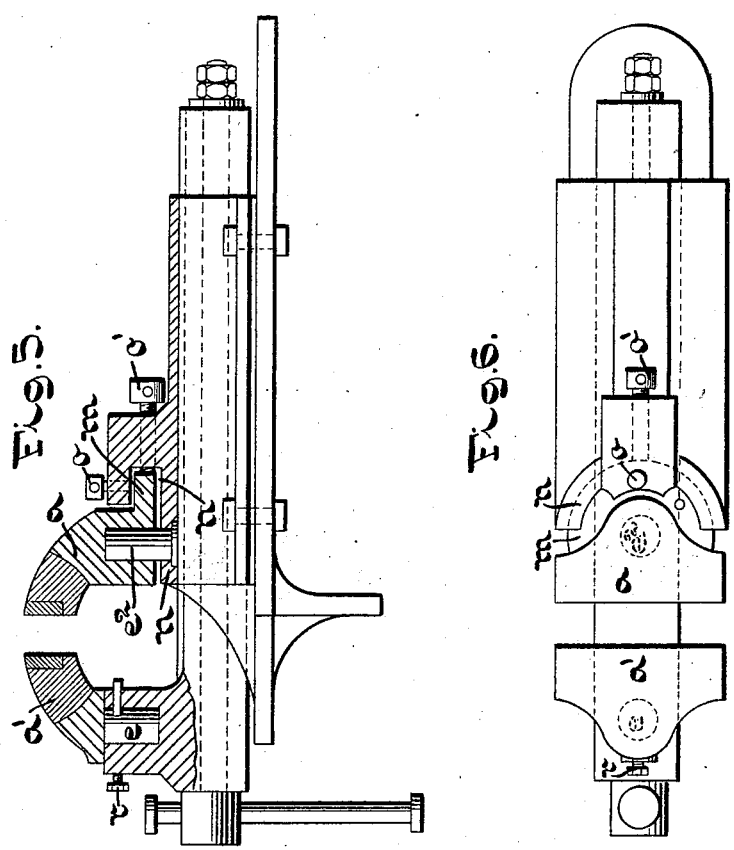
WITNESSES:
INVENTOR:
Otto Eisele,
BY
ATTORNEY

UNITED STATES PATENT OFFICE.

OTTO EISELE, OF CARLSRUHE, ASSIGNOR TO MICHAEL JAEGER, OF DARMSTADT, GERMANY.

REVOLVING VISE.

SPECIFICATION forming part of Letters Patent No. 513,261, dated January 23, 1894.

Application filed April 1, 1893. Serial No. 468,728. (No model.)

*To all whom it may concern:*

Be it known that I, OTTO EISELE, a subject of the Emperor of Germany, and a resident of Carlsruhe, in the Grand Duchy of Baden, German Empire, have invented certain new and useful Improvements in Revolving Vises, of which the following is a specification.

My invention has reference to improvements in vises, and has for its object to adapt the same for holding conical, wedge-shaped or other angular objects, and also to hold the objects in any desired position either inclined, vertical or horizontal.

The nature of my invention will best be understood when described in connection with the accompanying drawings, in which—

Figure 1:
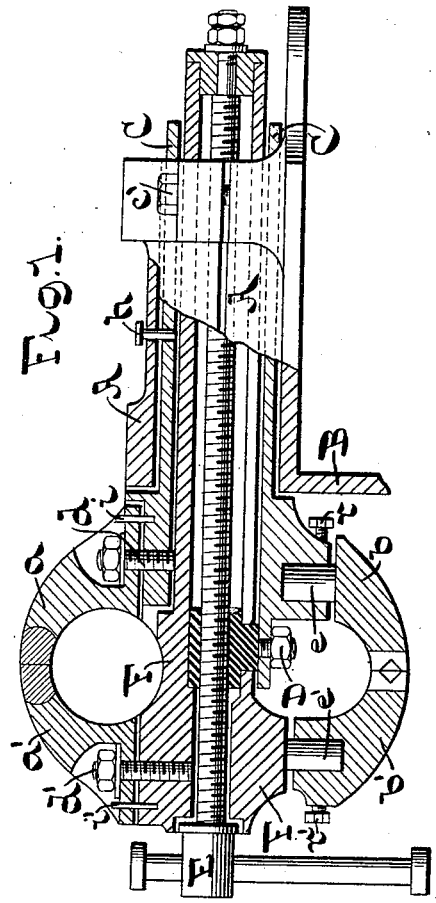
Figure 4:
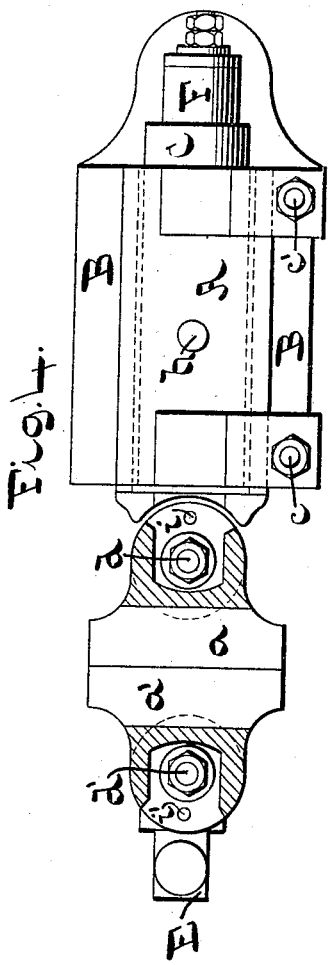
Figure 2:
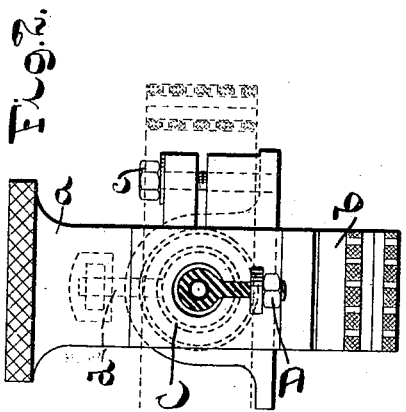
Figure 3:
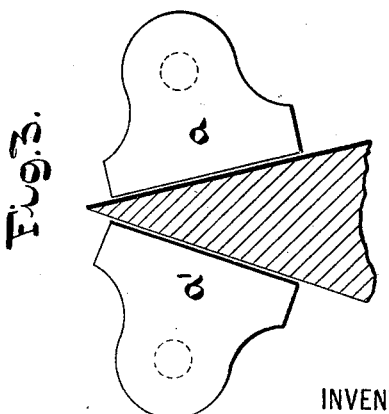

Figure 1 represents a sectional side view of a vise constructed according to my invention. Fig. 2 is a sectional end view thereof. Fig. 3 is a diagrammatic view illustrating the jaws in position for holding a wedge-shaped piece. Fig. 4 is a sectional plan or top view. Fig. 5 is a sectional side elevation of a modified form. Fig. 6 is a plan view of the same. Fig. 7 is a sectional side elevation of a second modified form. Fig. 8 is a diagrammatic view showing the jaws of the vise illustrated in Figs. 5 and 6 set at an angle.

Similar letters of reference indicate corresponding parts throughout the several views of the drawings.

In the drawings, referring at present to Figs. 1 to 4, the letter A designates the stock formed integral with a suitable base B. The stock is split longitudinally on one side thereof and is properly bored out to receive a tubular spindle C carrying at its front end two jaws $a$ and $b$, located diametrically opposite to each other. Within the spindle C is located a tubular slide F carrying the outer jaws $a'$ and $b'$ arranged opposite and adapted to the inner jaws $a\ b$. The tubular spindle F is slotted for the clamp nut D engaging the usual screw spindle E, for operating the movable jaws.

In order that the vise jaws may be set to any desired angle within certain limits, they are swiveled in any suitable manner, and means are provided for securing the same in position after adjustment. For instance as shown in Figs. 1 to 4, the upper jaws $a\ a'$ are arranged to turn about the studs $d\ d$ fastened in the spindle and the slide respectively, and are held secure after adjustment by screwing up the nuts on said studs. Suitable pins $i\ i'$ serve to set the jaws quickly into their parallel position. The lower jaw $b$, I have shown provided with a post $e$ fitted to turn in a socket in the spindle C, while the jaw $b'$ is fitted to turn about a post $e'$ secured in the slide F. In both instances the jaws are held after adjustment by the respective set screws $r, r'$.

The spindle C is fitted to turn freely within the stock A, and can be held in any desired position after adjustment by means of the screws $c\ c'$ arranged to draw the split stock together. A pin $h$ adapted to enter corresponding holes in the spindle C serves to bring the vises quickly into either a vertical or a horizontal line (Fig. 1). Either pair of jaws can therefore be brought to the top, or they can be set at any desired angle.

In Figs. 1 to 4 I have shown both pairs of jaws arranged to swivel, but it is evident that one set of jaws could be of the ordinary construction, that is to say, made with fixed jaws,—while the other set of jaws could be swiveled as described. For ordinary purposes the fixed jaws would be used, while when a conical or other irregularly shaped piece was to be held in the vise the swiveled jaws would be brought to face upward. Again one set of jaws can be made for a special purpose, say to serve as a pipe vise, or as a wire vise; or interchangeable cheeks for special purposes may be provided.

In Figs. 5 and 6, I have shown a modified form for the swiveled jaws. In this instance the inner jaw is mounted to turn on a post $e^2$, its lower portion being in the form of a plate $m$ fitting in a way $n$ formed in the stock, and engaged by a screw $o$ or by a screw $o'$.

In Fig. 7 I have shown an ordinary vise provided with swiveled jaws $a\ a'$ and its slide K mounted to turn in the stock A, and secured by a screw or screws $s$.

What I claim as new, and desire to secure by Letters Patent, is—

1. In a vise, the combination of a base provided with a split stock A, a tubular spindle C fitted to rotate in said stock, screws extending through the stock for holding the spindle, jaws $a\ b$ swiveled to said spindle, a tubular slide F located within the jaw spindle and carrying jaws $a'\ b'$ arranged opposite to the jaws $a\ b$, a screw spindle and nut for moving the slide F longitudinally within the spindle, a pin $h$ for determining the vertical and horizontal positions of the jaws, and a connection between the spindle and slide, substantially as described.

2. In a vise, the combination of a tubular spindle C fitted to rotate in the stock, means for holding the spindle, a tubular slide F located within said spindle, a connection between the spindle and the slide, and swiveled jaws secured respectively to the spindle and to the slide, substantially as described.

3. In a vise, the combination of a spindle fitted to turn in the stock, means for holding the spindle rigid when set, a slide mounted to move toward and from the stock, means for operating the same, opposite jaws mounted on the spindle and slide respectively to turn at right angles to the spindle, and set screws for holding the jaws rigid when set, substantially as described.

In testimony that I claim the foregoing as my invention I have signed my name in presence of two subscribing witnesses.

OTTO EISELE.

Witnesses:
 JEAN GRUND,
 FRANK H. MASON.